United States Patent [19]
Wenstrand

[11] Patent Number: 5,406,909
[45] Date of Patent: Apr. 18, 1995

[54] STOCK WATERING TANK WITH STAKE POCKET INDENTATIONS

[76] Inventor: Thomas W. Wenstrand, R.R. 4, Mount Pleasant, Iowa 52641

[21] Appl. No.: 128,165

[22] Filed: Sep. 29, 1993

[51] Int. Cl.⁶ .......................... A01K 5/01; A01K 7/00
[52] U.S. Cl. .......................................... 119/61; 119/72
[58] Field of Search ................. 119/61, 72, 73; 4/595; 206/515, 518; 220/674, 676; 248/500, 506, 508, 156, 154, 146

[56] References Cited

U.S. PATENT DOCUMENTS

| | | |
|---|---|---|
| 922,681 | 5/1909 | Eaton . |
| 933,066 | 9/1909 | Eaton . |
| 1,028,998 | 6/1912 | Eaton . |
| 1,029,745 | 6/1912 | Eaton . |
| 1,186,369 | 6/1916 | Barlow . |
| 1,220,404 | 3/1917 | Eaton . |
| 1,375,039 | 4/1921 | Eaton . |
| 1,566,571 | 12/1925 | Appleton . |
| 1,838,324 | 12/1931 | Olson . |
| 1,840,615 | 1/1932 | Arduser . |
| 1,922,612 | 8/1933 | Barker . |
| 2,772,660 | 12/1956 | Sand ........................ 119/61 |
| 3,202,131 | 8/1965 | Jones ........................ 119/61 |
| 4,034,715 | 7/1977 | Aener . |
| 4,651,679 | 3/1987 | Fassauer . |
| 4,922,858 | 5/1990 | Ahrens ..................... 119/73 |
| 4,962,730 | 10/1990 | Schafer ..................... 119/73 |

FOREIGN PATENT DOCUMENTS

| | | | |
|---|---|---|---|
| 504587 | 9/1992 | European Pat. Off. ........... 4/595 |
| 1187812 | 9/1959 | France .................... 119/61 |
| 661507 | 11/1951 | United Kingdom ............ 4/595 |
| 1263457 | 2/1972 | United Kingdom ............ 4/595 |

Primary Examiner—Todd E. Manahan
Attorney, Agent, or Firm—Henderson & Sturm

[57] ABSTRACT

A stock watering tank has side and end walls and a bottom adapted to rest upon a support surface, and a plurality of pocket indentations formed symmetrically about the base of the walls. A stake device is received in each pocket to hold down the tank against movement.

2 Claims, 2 Drawing Sheets

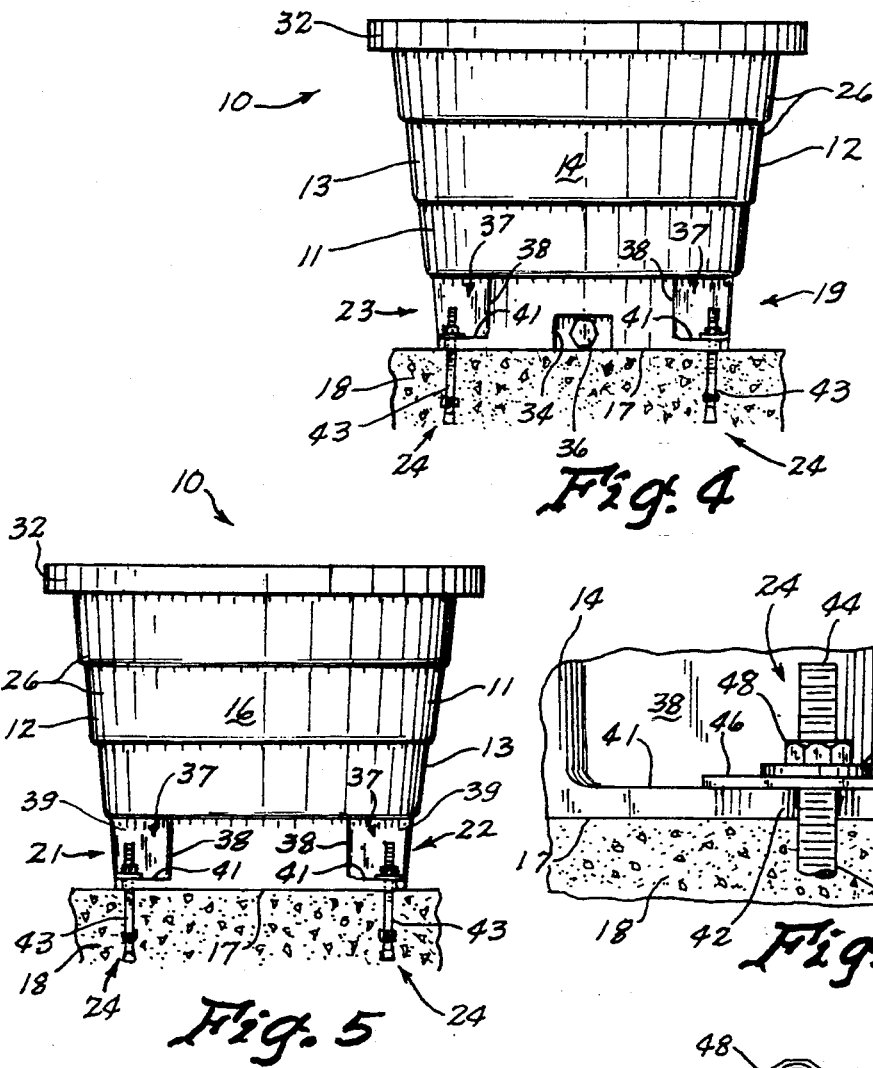
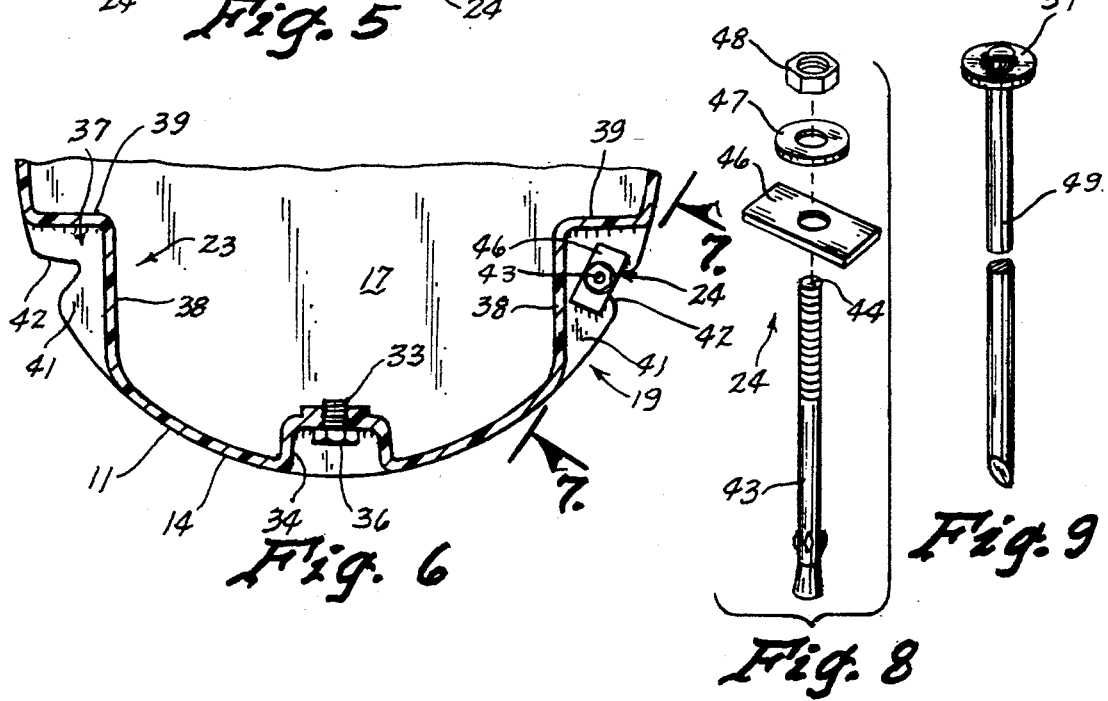

STOCK WATERING TANK WITH STAKE POCKET INDENTATIONS

TECHNICAL FIELD

This invention relates generally to stock watering tanks and in particular to tanks primarily of a one-piece molded structure.

BACKGROUND ART

Until current times, stock tanks were manufactured of galvanized steel. Therefore, whether the tanks were full of water or empty they were sufficiently heavy to prevent against being tipped over by an animal or by the wind. With the introduction of one-piece, primarily, tanks molded of plastic, those tanks were preferred due to their resistance to rust and because they were much lighter and easier to handle.

With those advantages, however, came the disadvantage of being easier to tip over or to be picked up by the wind, particularly when empty. To prevent same, users would put posts into the ground around the tanks, and nail 2'×4's to the posts and across the tank. Various other means such as concrete blocks or even boulders were used to hold down these extremely light, but durable tanks.

DISCLOSURE OF THE INVENTION

The present invention is an improved stock watering tank comprising a generally oval form in plan with arcuate side and end walls and a bottom panel; and within which are integrally formed a plurality of pockets arranged symmetrically about the side and end walls, with a stake unit provided for cooperation with each pocket and insertion into the ground or other support beneath the tank such as to render the tank immovable.

It is an object of this invention to provide a new and novel stock watering tank.

Another object of this invention is to provide an improved stock tank of molded plastic with simple but effective means for ensuring against movement of the tank during use.

Yet another object of this invention is to provide the tank with a plurality of indentations in the form of pockets, each with a notch formed therein through which a stake or like object may be driven into the support surface below, to hold down the tank.

It is still another object of this invention to form the pockets in a symmetrical arrangement for stability against tipping or high wind movement.

BRIEF DESCRIPTION OF THE DRAWINGS

Further objects and additional advantages of the invention will become apparent from the following description and annexed drawings wherein:

FIG. 4 is an elevational view of one end of the tank as taken along the line 4—4 in FIG. 3;

FIG. 5 is an elevational view of the opposite end of the tank as taken along the line 5—5 in FIG. 3;

FIG. 6 is an enlarged, fragmentary sectional view as taken along the line 6—6 in FIG. 3;

FIG. 7 is a fragmentary sectional detail view as taken along 7—7 in FIG. 6;

FIG. 8 is an exploded view in perspective of a stake unit; and

FIG. 9 is a perspective view of a modified stake unit.

BEST MODE FOR CARRYING OUT THE INVENTION

Figure 1:
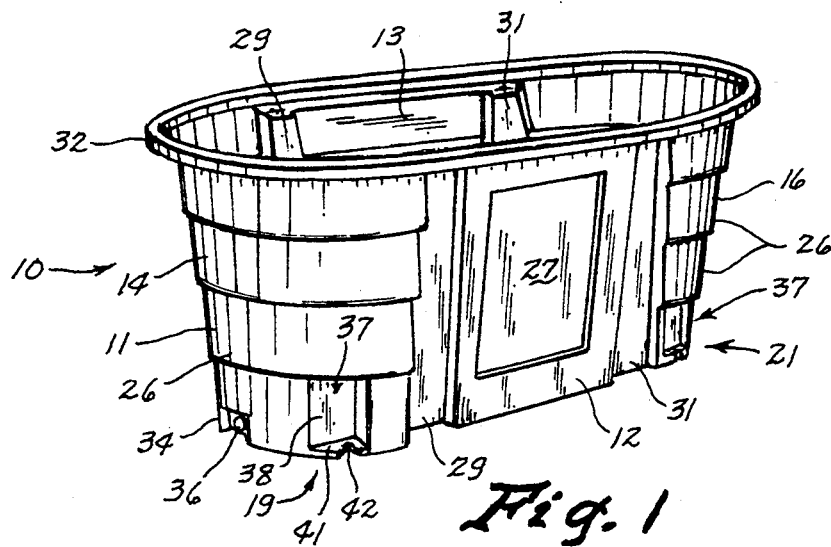
FIG. 1 is a perspective view of the stock watering tank of this invention.
Figure 2:
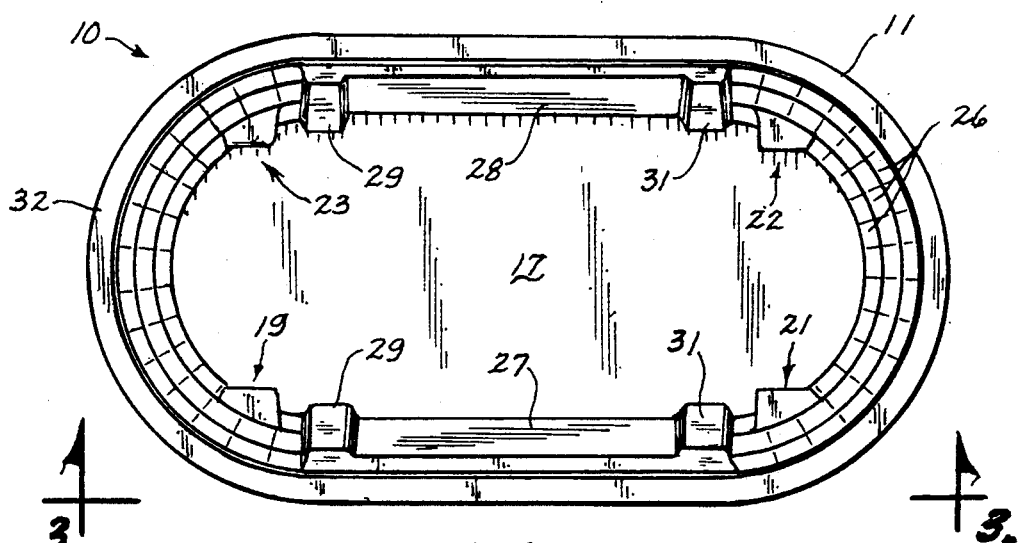
FIG. 2 is a plan view thereof.
Figure 3:
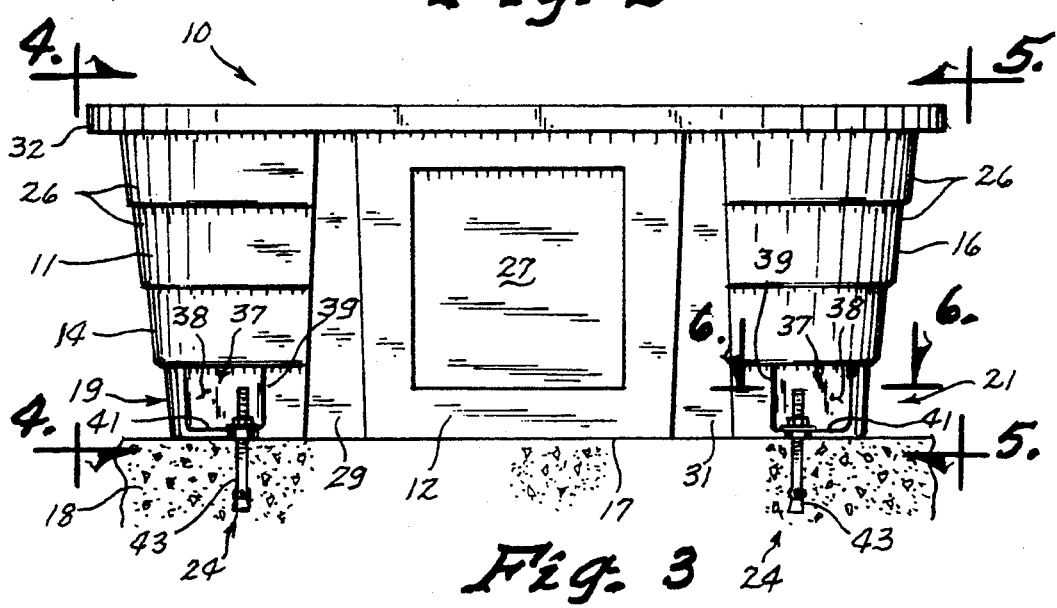
FIG. 3 is a side elevational view with stake devices applied to the tank.

Referring to the drawings herein, the stock watering tank of this invention is indicated generally at (10) and comprises an oval tank (11) having parallel side walls (12), (13) integral with arcuate end walls (14), (16) and a bottom panel (17) adapted to rest upon a support surface such as a concrete base (18) (FIG. 3). The stock watering tank (10) comprises further a plurality of pockets (19), (21), (22), (23) formed, for example, within the end walls (14), (16); each pocket (19), (21), (22), (23) adapted to receive a stake unit (24) for securing and holding the tank (11) against movement relative to the support surface base (18).

More particularly, the tank (11) is molded of plastic, and the embodiment herein is a four foot (4') version with ribbed end panels (26), and center panels (27), (28), flanked by vertical stiffeners (29), (31). A flange (32) is formed about the upper edge of the tank (11). A six foot (6') version (not shown) of the tank (11) is proved with a pair of center panels (27), (28) side-by-side on each side wall (12), (13). At one end wall (14), for example, threads (33) are formed in a depression (34) in the wall (14) in an integral manner to form a drain opening closed by a drain plug (36).

Formed symmetrically about the tank walls (12), (13), (14), (16) are the four pockets (19), (21), (22), (23). As each pocket is identical, only one will be described with like parts indicated by like reference numerals. Pocket (19), for example, is formed by an indentation (37) formed in the lower portion of end wall (14) and having an L-shape in plan with substantially vertical wall portions (38), (39) (FIG. 6) with a lower relatively flat ledge (41), and with the ledge (41) having a notch (42) formed substantially centrally therein.

To hold the tank (11) down on the base (18) and against movement thereon, each stake unit (24) comprises a stake (43) inserted through each notch (42) into the base (18); the upper end (44) of the stake (43) threaded to receive a plate (46), a washer (47) and a nut (48) for fastening the ledge (41) downwardly on the base (18) as best illustrated in FIG. 7. By this arrangement, lateral or end-wise movement of the tank (11) over the base (18) is prevented.

FIG. 9 discloses an alternative stake embodiment in the form of a stake (49) with an integral head (51) of a size sufficient to engage the ledge (41) upon the stake (49) being inserted through the notch (42) and into the base (18).

It will thus be seen that the objects of this invention have been fulfilled, and it is to be noted that the foregoing is to be interpreted in an illustrative, rather than a limiting sense. For example, the shape of the tank could be square or round, and the tank could contain features such as a built-in drinker without departing from the scope of the invention as defined in the appended claims.

I claim:

1. A stock watering tank comprising:
   a tank having a pair of side walls, a pair of end walls integral with said side walls, and a bottom integral with said walls, said bottom adapted to rest upon a support surface;
a plurality of pockets formed in said walls; and
stake means associated with each pocket for insertion into the support surface for holding the tank against movement relative to the support surface;
and further wherein said tank is molded of plastic, said pockets are formed symmetrically about said walls, each of said pockets forms an indentation in a said wall, each of said pockets has a ledge formed at a base thereof adjacent the bottom of said tank, each ledge formed inwardly of said walls, having a horizontally disposed upper surface, and having a flat bottom surface for resting on the support surface, each ledge having a notch formed therein, and wherein said stake means includes a stake for insertion through each said notch.

2. The stock watering tank of claim 1, and further wherein said stake means includes a unit for fastening each said stake to each said ledge.

* * * * *